United States Patent
Chen et al.

(10) Patent No.: US 6,340,991 B1
(45) Date of Patent: Jan. 22, 2002

(54) FRAME SYNCHRONIZATION IN A MULTI-CAMERA SYSTEM

(75) Inventors: Tsuhan Chen, Pittsburgh, PA (US); Sun-Yuan Kung; Yun-Ting Lin, both of Princeton, NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/223,772

(22) Filed: Dec. 31, 1998

(51) Int. Cl.[7] .............................................. H04N 9/475
(52) U.S. Cl. ......................................... 348/513; 348/47
(58) Field of Search .................................. 348/513, 512, 348/19, 47, 48, 14.15; H04N 9/475, 13/02

(56) References Cited

U.S. PATENT DOCUMENTS 6,008,839 A * 12/1999 Nagele ........................ 348/47
6,188,475 B1 * 9/2000 Iijima ........................ 348/47

* cited by examiner

Primary Examiner—Sherrie Hsia
(74) Attorney, Agent, or Firm—Banner & Witcoff, Ltd.

(57) ABSTRACT

A technique is provided for calculating the time offsets between different video cameras and re-synchronizing the captured frames in a post-processing manner, thus eliminating the necessity of an explicit common clock for synchronization. This approach allows effective synchronization of frames from different cameras so that a multi-camera system can be used to more accurately analyze a subject under observation.

2 Claims, 2 Drawing Sheets

FIG. 3

$$C_1 = \begin{bmatrix} U_x \\ U_y \\ U_z \end{bmatrix} = \begin{bmatrix} 1 & 0 & 0 \\ 0 & 1 & 0 \\ 0 & 0 & 1 \end{bmatrix} = I$$

$$C_2 = \begin{bmatrix} U'_x \\ U'_y \\ U'_z \end{bmatrix}$$

FIG. 4

$$\begin{bmatrix} X' \\ Y' \\ Z' \end{bmatrix} = C_2 \left\{ \begin{bmatrix} X \\ Y \\ Z \end{bmatrix} - \begin{bmatrix} X_0 \\ Y_0 \\ Z_0 \end{bmatrix} \right\}$$

$$\begin{bmatrix} X \\ Y \\ Z \end{bmatrix} = C_2^{-1} \begin{bmatrix} X' \\ Y' \\ Z' \end{bmatrix} + \begin{bmatrix} X_0 \\ Y_0 \\ Z_0 \end{bmatrix}$$

FRAME SYNCHRONIZATION IN A MULTI-CAMERA SYSTEM

The present invention relates generally to the field of camera systems, and more particularly, is directed to a method for frame synchronization in a multi-camera system.

BACKGROUND OF THE INVENTION

In recent years, multi-camera systems have found many applications that require tracking of moving objects and reconstruction of object shapes. For example, a multi-camera system can be used to track customers in a department store so that the time each customer spends in each department can be recorded and analyzed. Such a system can also be used to track the position and head orientation of a computer user sitting at a keyboard, an essential task in building a "smart" computer that interacts with the user.

Video telephone and video conferencing equipment can also use a multi-camera system to track the motion of participants and aim the video cameras at a specific participant, such as the person talking. Other applications include surveillance and remote sensing. While it is possible to accomplish some of these tasks with a single camera, multi-camera systems offer a number of advantages. These advantages include the following:

1. Multiple cameras allow more precise information to be obtained from different areas, thus enhancing robust estimation and the final verification process;
2. Multiple cameras can more readily find the actual size and location of an object, thereby eliminating or greatly reducing the intrinsic scale ambiguity problem on shape and location estimates when a single camera is used; and
3. Multiple cameras can combine partial shapes seen from individual cameras through a registration process to form a more complete 3 dimensional (3D) view of the object.

While multi-camera systems have preferred advantages over single camera systems, use of such multi-camera systems present their own challenges. One such challenge is to ensure synchronization among frames captured by different cameras. Although it is possible for a central control unit to distribute a common clock signal to all cameras, such a solution is often very costly to implement.

SUMMARY OF THE INVENTION

Accordingly, it is an object of the present invention to obviate the above-noted shortcomings and disadvantages of single and multi-camera systems known in the prior art.

Another object of the present invention is to provide a method of synchronization of the captured frames of a multi-camera system which can be easily and inexpensively performed.

It is another object of the present invention to provide a method of synchronization of the captured frames of a multi-camera system which does not rely on the use of a common clock signal for each of the cameras.

It is another object of the present invention to provide a method of frame synchronization which is fully effective and reliable.

In accordance with the present invention, a technique is provided for calculating the time offsets between different cameras and re-synchronizing the captured frames in a post-processing manner, thus eliminating the necessity of an explicit common clock. This approach allows effective synchronization of frames from different cameras so that a multi-camera system can be used to more accurately analyze the subject under observation.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

FIGS. 3 and 4 illustrates matrices which contain orthonormal row vectors used to form the basis of a coordinate system.

BRIEF DESCRIPTION OF THE PREFERRED EMBODIMENT

In a video acquisition process where there are, for example, two image sequences having the same frame rate for the same scene containing multiple moving objects shot by two different cameras, there exists intrinsic difficulty in keeping the two sequences fully synchronized under a central clock signal. Such a situation is commonly encountered in many environments. One such environment is a surveillance system in which there is no guarantee that the recording process starts at the same time instant for all cameras. In other words, one sequence may lag another by an arbitrary and unknown amount even though the frame rates are the same.

To correctly identify each object's movement (location and rotation) and reconstruct its 3D shape, object correspondences and frame synchronization are essential tasks. Resolution of the frame synchronization problem involves a determination of the time shift between frames where the individual image sequences have the same frame rate and with known camera geometry. The recovery of the time shift is important for integrated processing of multiple image sequences.

In recovering the time shift in accordance with the present invention, Applicants utilize the following observations:

1. The motion of a rigid body should be the same for observers at different locations (multiple cameras). Thus, the motion of an object provides key information for matching frame pairs from different cameras.
2. A rigid body's rotation and scaled translation can be estimated from processing individual sequences. The best match of frame pairs results from close similarity of their estimated rotation since rotation cannot be changed by an arbitrary scale factor.
3. When the time shift between two sequences is a multiple of frame duration (i.e. the product of time shift and frame rate is an integer), then the synchronization problem can be formulated as a string matching problem.

The degree of matching, or matching score, can be defined as the distance of two rotation matrix sequences and/or that of two translational vector sequences.

4. In general, the time shift need not be an integer. An interpolation scheme is therefore proposed to improve the matching score so as to find the best match up to a fraction of frame duration.

Figure 1:
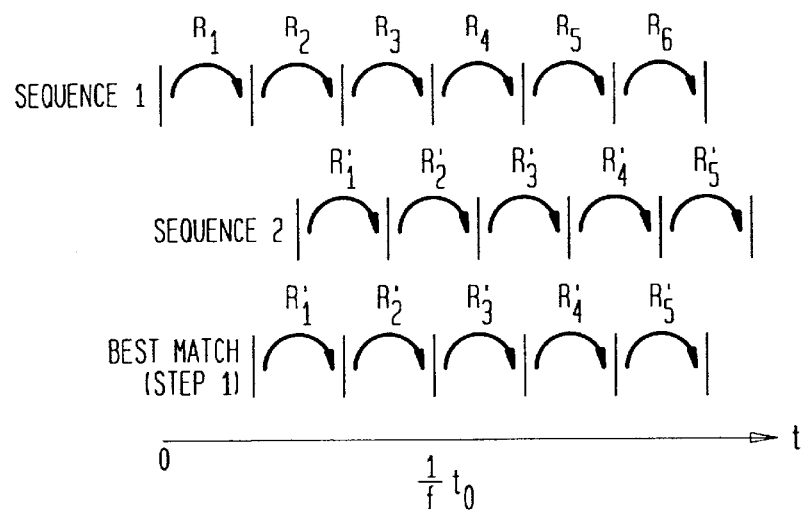
FIG. 1 is a mathematical representation of two non-synchronized camera frame sequences.

FIG. 1 illustrates two non-synchronized sequences. Here, rotation string {R} is an estimate from as image sequence 1 while rotation string {R'} is an estimate from an image sequence 2 of the same object. As shown in FIG. 1, each string is plotted along a time axis "t". The best match found in a first processing step 1 indicates that sequence 2 should lag sequence 1 by one frame as illustrated in FIG. 1. To find the final solution $t_0$ in a step 2 for "fine-tuning" requires interpolation of the rotation strings.

The para-perspective projection model is assumed and factorization is used to reconstruct the 3D rotation $R_{3f\times3}$ translation $T_{3f\times1}$ and shape $S_{3\times N}$. (A paraperspective factorization method for shape and motion recovery is described by C. J. Poelman and T, Kanada (Report CMU-CS-92-208, CMU, 1992) and is incorporated herein by reference.) Here, N is the number of feature points in this object cluster. For each frame, R(f) is a 3×3 rotation matrix describing the orientation of the object in frame f and T(f) is a 3×1 translation vector specifying the location of the object.

The para-perspective assumption yields two possible solutions for R and S for a single object from each camera due to its inability to distinguish a point's location to be in front of or behind the "scaled" image plane which goes through the object center. Without auxiliary information (e.g. occlusion) in a single camera system, this ambiguity cannot be resolved under the para-perspective assumption. However, as will be discussed below, this ambiguity can be solved if a second camera is viewing the same target or if a true perspective projection model is used to find the estimation.

Figure 2:
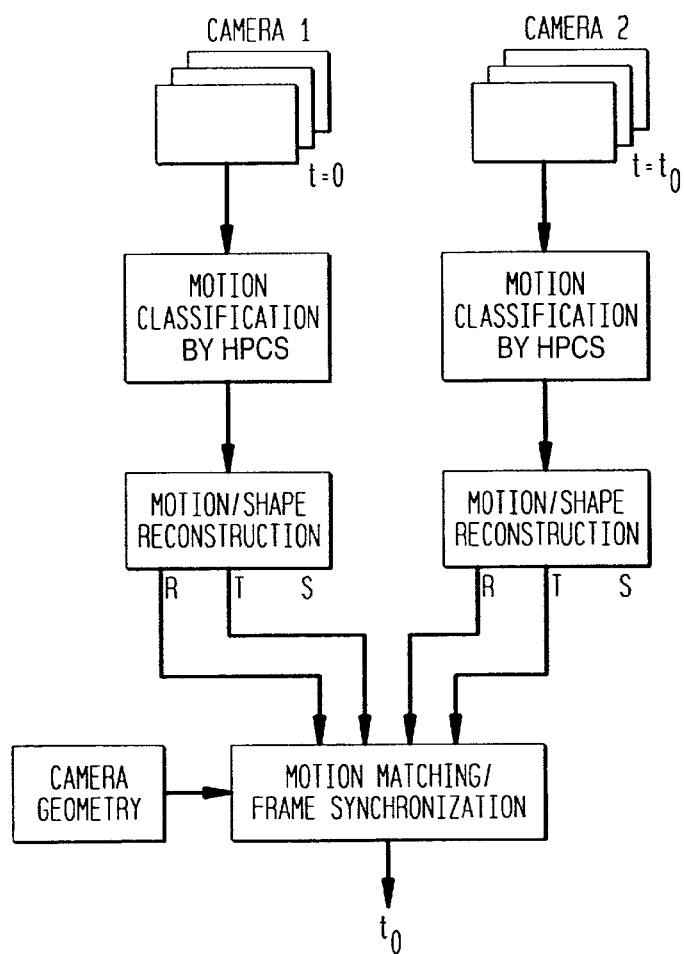
FIG. 2 illustrates a flow chart for motion matching and frame synchronization in accordance with the present invention.

FIG. 2 illustrates a flow chart for motion matching and frame synchronization in accordance with the present invention. Each camera has its own local coordinate system. Let a first camera 1, for example, be a reference camera whose local coordinate is the world coordinate and its focus matches the world origin. Let $C_1$ and $C_2$ be the matrices containing the orthonormal row vectors which form a basis for each coordinate system respectively, as illustrated in FIG. 3.

As shown in FIG. 3, $U_x$, $U_y$ and $U_z$ form the orthonormal basis for a coordinate system 1 and $U_x$, $U_y$, and $U_z$, forms the orthonormal basis for a coordinate system 2. The origin of coordinate system $C_1$ is the world origin, for example, $O_1 = [0\ 0\ 0]^T$. The origin of coordinate system $C_2$ is $O_2 = [X_0\ Y_0\ Z_0]^T$. The conversion between two coordinate systems for a 3D point $P = [X\ Y\ Z]^T$ in coordinate system 1 and $[X'Y'Z']^T$ in coordinate system 2 is quite straightforward and is illustrated in FIG. 4.

For single objects, the reconstruction result from camera 1 and camera 2 is denoted by $R_1$, $S_1$ (in $C_1$) and $R_2$, S2 (in $C_2$), respectively. In order to represent them in the same coordinate system, for example $C_1$, the positions of the set of points for each frame are $R_1(f)S_1$ for camera 1 and $C_2^{-1}R_2(f)S_2$ for camera 2. Since objects have one rigid motion which can be represented by the orientation (rotation) change between two consecutive frames, the following theorem can be obtained:

Theorem 1 - Assume that all objects in a scene have a distinctive rigid motion. Thus, then the reconstructed rotation matrices $R_1$ and $R_2$ from cameras 1 and 2, respectively represent the same rigid motion if, and only if, the following relationship is true.

Equation (1) $R_1(f)R_1^{-1}(1) = C_2^{-1}R_2(f)R_2^{-1}(1)C_2\ \forall\ f$

For simplicity, the first frame is used as the reference frame so that for both cameras 1 and 2, $R_1(1) = I$ and $R_2(1) = I$. Thus, Equation (1) then becomes:

$R_1(f) = C_2^{-1}R_2(f)C_2\ \forall f$.

The para-perspective assumption provides two possible solutions of R and S for a single object from each camera due to its inability to distinguish whether a point's location is in front of behind the "scaled" image plane which passes through the object's center. Suppose from camera 1, the two sets of solution for the rotation and shape of object A are denoted by RAI, $^S$AD RAI and Sail respectively. Let J=:

$$J = \begin{matrix} 1 & 0 & 0 \\ 0 & 1 & 0 \\ 0 & 0 & -1 \end{matrix}$$

Thus, the two sets of solutions have the following relationship:

$S^-_{A1} = JS_{A1}$ $R^-_{A1} = JR_{A1}J$

This also applies to the two sets of solution from camera 2. Therefore, $S^-_{A2} = JS_{A2}$ and $R^-_{A2} = JR_{A2}J$.

Theorem 2 - Given two sets of rotation estimates per camera for the same object, $R_1$, $JR_1J$ from camera 1 and $R_2$, $JR_2J$ from camera 2, if $R_1(f)\ R_1^{-1}(1) = C_2^{-1}R_{2(f)\ R2}^{-1}(1)C_2\forall f$, then:

$R_1(f)\quad C_2^{-1}J\ R_2(f)\ J\ C_2$ $J\ R_1(f)J\quad C_2^{-1}\ R_2(f)\ C_2$ $J\ R_f(f)J\quad C_2^{-1}\ J\ R_2(f)\ J\ C_2$ In other words, there is only one unique match and consequently a unique set of object motion and shape can be determined. Note that this sign ambiguity can also be removed with only single camera sequence by taking advantage of the predictable choice between concavity/convexity versus positive/negative displacement from the center's image. However, it is important that the second camera offers another more robust alternative to find this unique matching.

As explained above, there is intrinsic difficulty in using two cameras to shoot the same scene in a fully synchronized manner. In other words, one sequence may lead or lag another by an arbitrary unknown amount even though the frame rate is the same. The present invention determines the time offsets between the different cameras so that individual frames can be synchronize together. This serves as an important processing stage in many video applications.

When two sequences are fully synchronized, then the motion, especially rotation, reconstructed from individual sequences greatly improves the ability to match the same object in different views. If a sufficient number of frames is considered, multiple rotation strings (due to multiple objects) from one camera can be interpreted as being a time-shifted version of those frame from another camera. Object matching and frame synchronization can therefore be treated as solving a pairwise string matching problem. Two rotation strings from different cameras tend to be shifted and the best match can be found via a matching score function which indicates the similarity of the two rotation strings.

As shown in FIG. 1, if the two rotation strings {R} and {R'} are from the same object, then is desired to find to so that to =arg maxt MatchScore(R(f-t),R'(f)). In the special case when the time offset to is a multiple of the frame duration, then to is an integer. However, in general to need not be an integer. Without knowing whether to is an integer, the problem can be solved by the following steps:

Step 1: Find $t_0$ for its best integer solution by string matching.

Step 2: Fine-tune $t_0$ by linear interpolation of rotation strings.

In practice, the temporal offset between two sequences captured by different cameras is limited to one frame interval, except for the rare case that one camera introduces some delay in the capturing mechanism. Therefore, Step 1 above can usually be skipped. Step 2 is applied to find the best to that maybe positive or negative.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A method of synchronizing video frames of a moving object captured from a plurality of video cameras, said method comprising the steps of:

capturing a first sequence of video frames from a first video camera;

capturing a second sequence of video frames from a second video camera;

calculating the time difference between the start of said first sequence of video frames and the start of said second sequence of video frames; and synchronizing said first sequence of video frames to said second sequence of video frames in accordance with said time difference, wherein said calculating step includes the steps of:

processing said first sequence of video frames to derive a first mathematical model of the motion of said object represented by said first sequence of video frames;

processing said second sequence of video frames to derive a second mathematical model of the motion of said object represented by said second sequence of video frames; and comparing said first mathematical model to said second mathematical model to calculate said time difference.

2. The method of claim 1 wherein said processing steps include the step of using paraperspective factorization to derive said first and said second mathematical models.

* * * * *

UNITED STATES PATENT AND TRADEMARK OFFICE
CERTIFICATE OF CORRECTION

PATENT NO. : 6,340,991 B1
DATED : January 22, 2002
INVENTOR(S) : Tsuhan Chen et al.

It is certified that error appears in the above-identified patent and that said Letters Patent is hereby corrected as shown below:

<u>Title page,</u>
Item [56], References Cited, "6,188,475" has been replaced with -- 6,118,475 --.

Signed and Sealed this

Twenty-sixth Day of November, 2002

*Attest:*

JAMES E. ROGAN
*Director of the United States Patent and Trademark Office*

*Attesting Officer*